United States Patent [19]

Bouteille

[11] Patent Number: 5,653,658
[45] Date of Patent: Aug. 5, 1997

[54] BEARING LUBRICATION SYSTEM

[75] Inventor: Remi E. Bouteille, Echirolles, France

[73] Assignee: Caterpillar Inc., Peoria, Ill.

[21] Appl. No.: 594,071

[22] Filed: Jan. 30, 1996

[51] Int. Cl.$^6$ .............................. F16H 57/04; F16N 7/26
[52] U.S. Cl. .................. 475/159; 184/6.12; 184/11.2; 384/473
[58] Field of Search .................. 475/159; 184/11.1, 184/11.2, 13.1, 6.12; 74/467, 468; 384/465, 473

[56] References Cited

U.S. PATENT DOCUMENTS

| | | | |
|---|---|---|---|
| 3,785,458 | 1/1974 | Caldwell et al. | 184/11.1 X |
| 4,222,283 | 9/1980 | Nagy | 74/467 |

FOREIGN PATENT DOCUMENTS

| | | | |
|---|---|---|---|
| 57-137767 | 8/1982 | Japan | 184/6.12 |
| 2-278059 | 11/1990 | Japan | 74/467 |

Primary Examiner—Charles A. Marmor
Assistant Examiner—Nathan O. Jensen
Attorney, Agent, or Firm—Claude F. White; Diana L. Charlton

[57] ABSTRACT

A bearing lubrication system for a final drive arrangement includes a first oil supply chamber and a rotatable gear within the first chamber. A first housing, which defines the chamber, contains a passageway which connects the first oil chamber with a cavity adjacent a first bearing assembly. The cavity is in fluid communication with a second oil chamber and a second bearing assembly by way of a longitudinal bore. A steel ring member prevents lubricating fluid from flowing past the first bearing assembly and ensures a supply of fluid to the second bearing assembly.

12 Claims, 3 Drawing Sheets

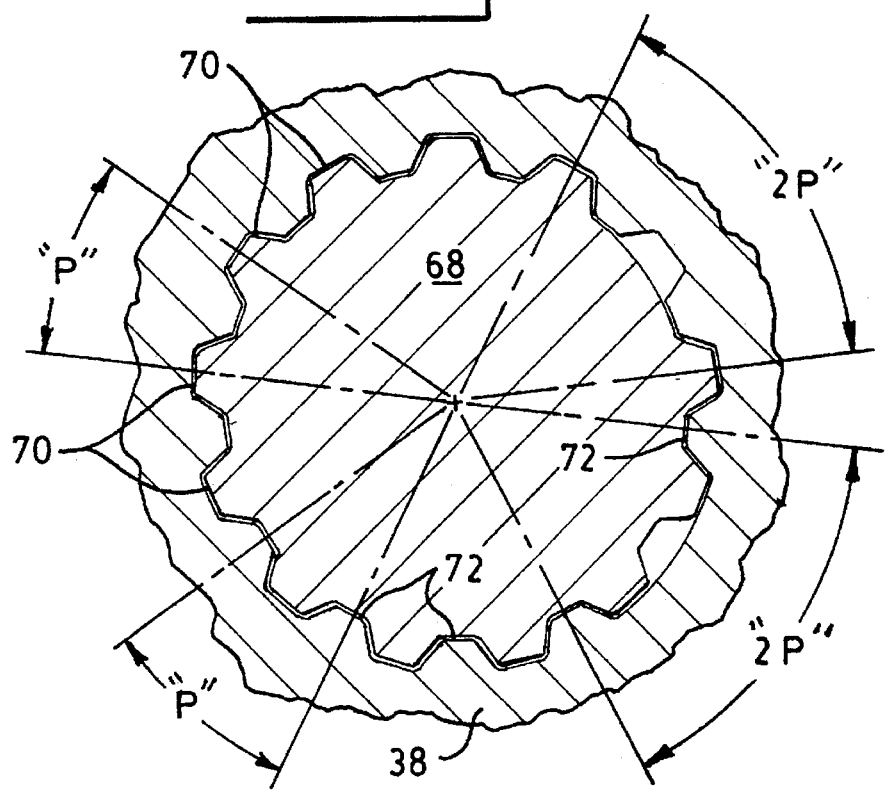
Fig_6_
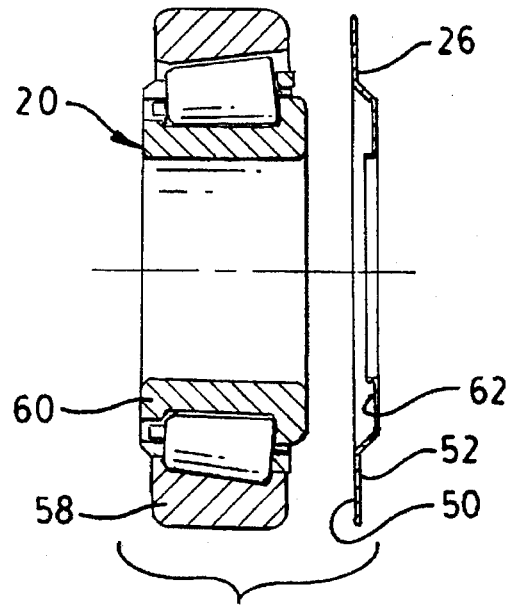
Fig_7_

5,653,658

BEARING LUBRICATION SYSTEM

TECHNICAL FIELD

This invention relates generally to a bearing lubrication system and more particularly to such a system in combination with a powered final drive arrangement.

BACKGROUND ART

Earthmoving and construction machines, such as track-type tractors, track-type loaders, and excavators utilize a powered final drive arrangement to transfer the power from an engine to endless track assemblies. In one arrangement, a power unit, such as a hydraulic motor, is mounted within the final drive assembly and has a cantilevered drive gear which drives the final drive arrangement. The drive gear is drivingly connected to a rotatable pinion, which is mounted in first and second bearing assemblies within first and second housings. The second bearing assembly is positioned in an area that receives little or no lubricating fluid. This is detrimental to the bearing life and extended service of the final drive arrangement.

DISCLOSURE OF THE INVENTION

In one aspect of the present invention, a bearing lubrication system for a machine arrangement includes first and second housings adapted to be connected together, with the first and second housings defining respective first and second chambers. A rotatable gear and a pinion are rotatably mounted within the first chamber with the pinion having an external gear portion adapted to mesh with the rotatable gear. The pinion also has an internal gear portion and a shaft portion which defines a longitudinal bore extending therethrough. The shaft portion includes first and second end portions which are respectively mounted within first and second bearing assemblies within respective first and second housings. A ring member is secured between the first end portion of the shaft portion and the first housing.

The second bearing assembly is positioned in an internal area of the machine arrangement which makes lubrication of this bearing assembly difficult. The subject invention provides lubrication to this second bearing assembly by way of the rotatable gear sending oil to a cavity adjacent to the ring member. The oil is transported from the cavity through the longitudinal bore and to the second bearing assembly. The ring member substantially blocks the flow of oil through the first bearing assembly to insure a supply of oil to the second bearing assembly.

BRIEF DESCRIPTION OF THE DRAWINGS

FIG. 6 is a diagrammatic sectional view generally taken along the lines 6—6 of FIG. 1; and FIG. 7 is a diagrammatic elevational view of a bearing assembly and a ring member of the present invention.

BEST MODE FOR CARRYING OUT THE INVENTION

Figure 1:
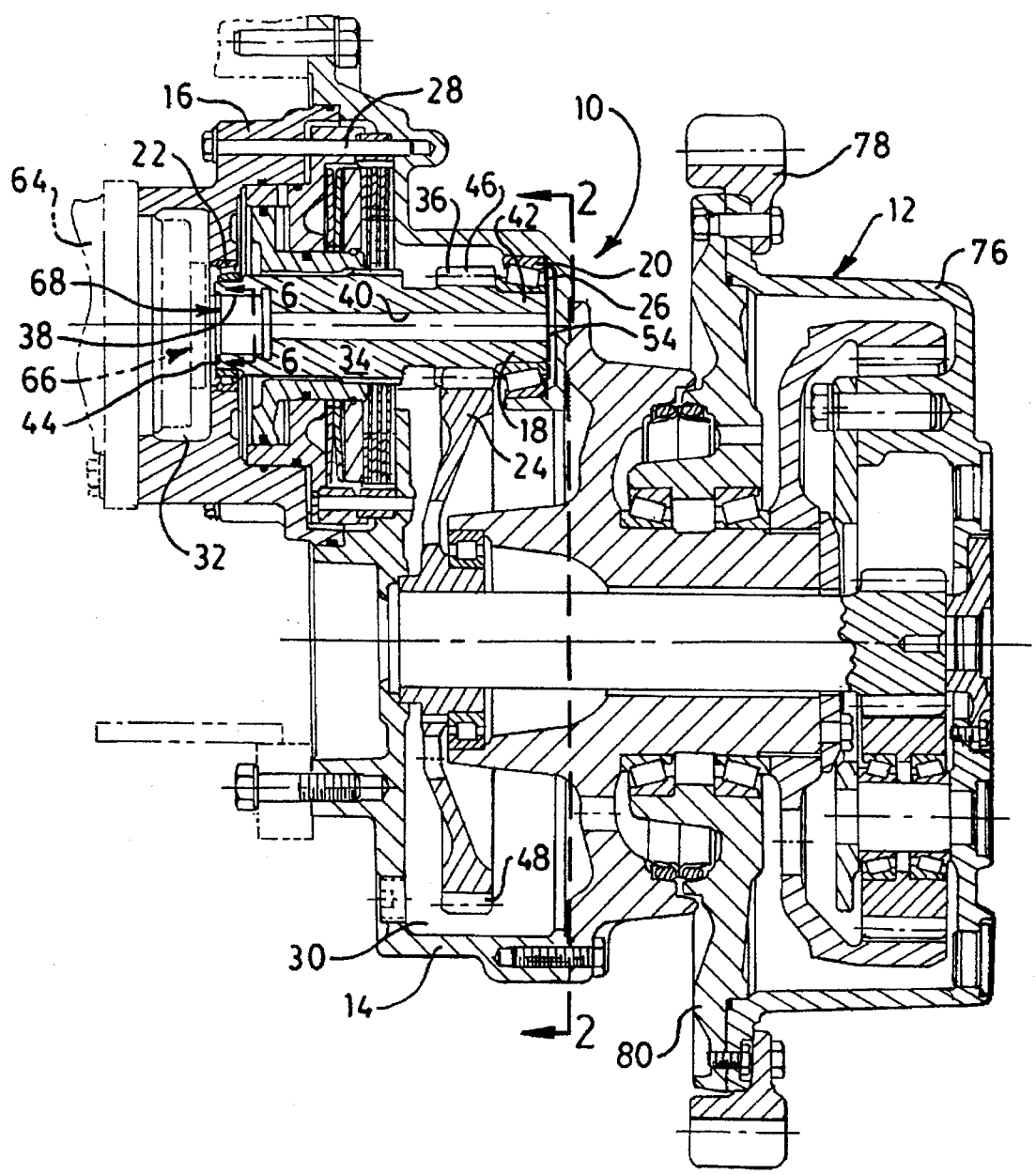
FIG. 1 is a diagrammatic sectional view of a machine arrangement incorporating the subject invention.
Figure 2:
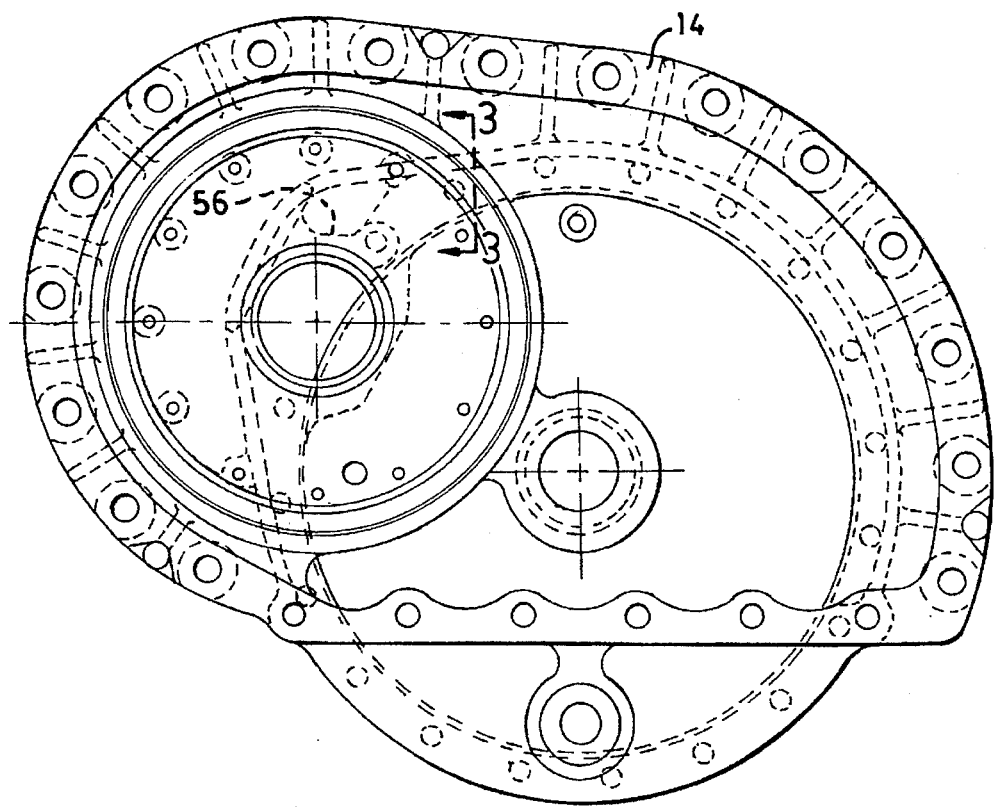
FIG. 2 is a diagrammatic front elevational view of a housing taken generally along the lines 2—2 of FIG. 1.
Figures 3, 4, 5:
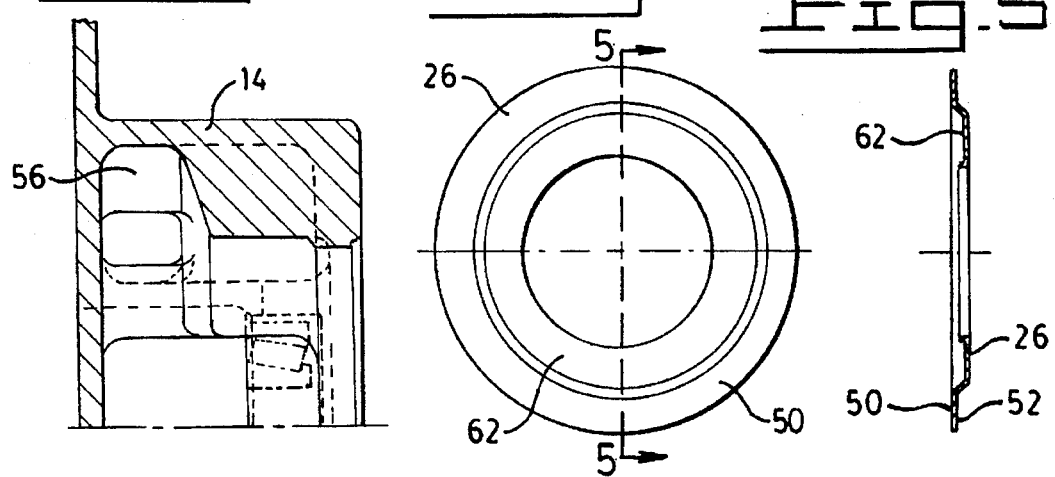
FIG. 3 is a diagrammatic sectional view taken generally along the lines 3—3 of FIG. 2.
FIG. 4 is a diagrammatic plan view of a ring member of the present invention.
FIG. 5 is a diagrammatic sectional view taken generally along the lines 5—5 of FIG. 4.

With reference to the drawings, a bearing lubrication system 10 for a machine arrangement, such as a final drive arrangement 12, includes first and second housings 14,16, a pinion 18, first and second bearing assemblies 20,22, a rotatable gear 24, and a metal ring member 26. The first and second housings 14,16 are adapted to be connected together by a plurality of fasteners 28, with the first housing 14 defining a first oil chamber 30 and the second housing defining a second chamber 32. The rotatable gear 24 and the pinion 18 are rotatably mounted within the first chamber 30. The pinion 18 includes a shaft portion 34, an external gear portion 36, an internal gear portion 38, and a longitudinal bore 40 extending through the shaft portion 34. The shaft portion 34 includes first and second end portions 42,44, which are mounted respectively by the first and second bearing assemblies 20,22 within respective first and second housings 14,16. The teeth 46 of the external gear portion 36 are adapted to mesh with the teeth 48 of the rotatable gear 24.

The ring member 26, preferably formed of steel, is secured between the first end portion 42 of the shaft portion 34 and the first housing 14. The ring member 26 has a first flat surface portion 50 engageable with the first bearing assembly 20, and a second surface portion 52 engageable with the first housing 14. A cavity 54 is defined by the first housing 14, the ring member 26, and the first end portion 42 of the shaft portion 34. A passageway 56, formed within the first housing 14, connects the first oil chamber 30 to the cavity 54. The first bearing assembly 20 includes a cup portion 58 and a cone portion 60. The ring member 26 has a recessed portion 62 adapted to engage the bearing cone portion 60, and the first flat surface portion 50 is adapted to engage the cup portions 58.

A power unit 64, such as a hydraulic motor, is mounted to the second housing 22 and includes a first end portion 66 positioned within the second chamber 32. The first end portion 66 of the power unit 64 includes a gear portion 68, or spline, which is adapted to mesh with the internal gear portion 38 of the shaft portion 34. The gear portion 68 has a plurality of equally spaced external teeth 70 with each two adjacent teeth 70 defining a predetermined pitch "P" therebetween. The internal gear portion 38 has a similar number of equally spaced internal teeth 72 with each two adjacent teeth 72 defining a predetermined pitch "P" therebetween. However, to provide that the oil can more easily flow through the connection of the gear portion 68 and the internal gear portion 38 to reach the second bearing assembly 32, one of the external teeth 70 and/or one of the internal teeth 72 can be eliminated or removed. With one tooth 70,72 removed, two of the adjacent teeth 70,72 will define a space of "2P" therebetween.

The machine arrangement preferably includes a final drive arrangement 12 having a spindle 74, a planet gear carrier 76, a sprocket wheel 78, and a supporting hub 80. The spindle 74 is connected to the first housing 14 such that the first housing 14, the second housing 16, and the spindle 74 enclose the first oil chamber 30. The first oil chamber 30 is adapted to contain a supply of lubricating oil and the rotatable gear 24 is adapted to disperse the oil to various portions of the final drive arrangement 12. The power unit 64 is adapted to rotate the pinion 18, which in turn rotates the rotatable gear 24, the planet carrier 76, the supporting hub 80, and the sprocket wheel 78.

The final drive arrangement 12 includes the bearing lubrication system 10, which is a specific means for delivering lubricating fluid to the second bearing assembly 22 from the first oil chamber 30. The lubricating means includes the steel ring member 26, the passageway 56, the first oil chamber 30, the longitudinal bore 40, the second oil chamber 32, the rotatable gear 24, and the cavity 54. The lubricating fluid which flows through the longitudinal bore 40 collects in the second oil chamber and provides for a continuous supply of lubricating fluid to the second bearing assembly 22.

INDUSTRIAL APPLICABILITY

With reference to the drawings and the previous detailed description, the subject invention is particularly useful with final drive arrangements 12 of earthmoving and construction machines. The bearing lubrication system 10 is intended to provide lubricating fluid to the second bearing assembly 22. The second bearing assembly 22 is located in an internal area of the final drive arrangement 12 which makes it difficult to provide lubricating fluid to this bearing assembly 22.

The first oil chamber 30 contains a supply of oil and as the rotatable gear 24 rotates, a certain amount of this oil is splashed into the internal passageway 56, and from there the oil flows into the cavity 54. The steel ring member 26 substantially prevents the oil from flowing through the first bearing assembly 20. From cavity 54, the oil is urged by centrifugal force through the longitudinal bore 40 through the gear connection 68,38, and into the second oil chamber 32. The oil collects in the chamber 32 and provides a continuous supply of lubricating fluid to the second bearing assembly 22. One of the teeth 70,72 on the gear portion 68 or the internal gear portion 38 can be removed or eliminated to provide easier flow of oil through this gear connection.

Other aspects, objects and advantages of this invention can be obtained from a study of the drawings, the disclosure and the appended claims.

I claim:

1. A bearing lubrication system for a machine arrangement, comprising:
   a first housing defining a first oil chamber;
   a second housing adapted to be connected to said first housing;
   a rotatable gear rotatably mounted within said first chamber;
   a pinion rotatably mounted within said first chamber, said pinion having a shaft portion, an external gear portion, an internal gear portion, and said shaft portion having first and second end portions and defining a longitudinal bore extending therethrough, said external gear portion adapted to mesh with said rotatable gear;
   a first bearing assembly mounting said first end portion of said shaft portion within said first housing;
   a second bearing assembly mounting said second end portion of said shaft portion within said second housing; and
   a ring member secured between said first end portion of said shaft portion and said first housing, said ring member having a first surface portion engageable with said first bearing assembly and a second surface portion engageable with said first housing.

2. A bearing lubrication system, as set forth in claim 1, including a second chamber defined by said second housing.

3. A bearing lubrication system, as set forth in claim 2, including a power unit having a first end portion positionable within said second chamber and a gear portion adapted to mesh with said internal gear portion of said shaft portion.

4. A bearing lubrication system, as set forth in claim 1, including a cavity defined by said first housing, said ring member, and said first end portion of said shaft portion, and a passageway within said first housing, said passageway connecting said first chamber to said cavity.

5. A bearing lubrication system, as set forth in claim 1, wherein said ring member is a steel member and said first bearing assembly includes a cup portion and a cone portion, said ring member having a flat portion adapted to engage said cup portion and a recessed portion adapted to engage said cone portion.

6. A bearing lubrication system, as set forth in claim 3, wherein said gear portion has a plurality of equally spaced teeth with each two adjacent teeth defining a predetermined pitch therebetween, and at least two adjacent teeth defining a space therebetween equal to twice said predetermined pitch.

7. A bearing lubrication system, as set forth in claim 3, wherein said internal gear portion has a plurality of equally spaced teeth with each two adjacent teeth defining a predetermined pitch therebetween, and at least two adjacent teeth defining a space therebetween equal to twice said predetermined pitch.

8. A bearing lubrication system, as set forth in claim 1, wherein said machine arrangement includes a final drive assembly having a supporting hub, a planet gear carrier, and a sprocket wheel, said supporting hub, gear carrier, and sprocket wheel being rotatable by said pinion and said rotatable gear.

9. A final drive arrangement, comprising:
   a first housing;
   a second housing connected to said first housing;
   a spindle connected to said first housing, said first housing, said second housing, and said spindle defining a first oil chamber;
   a power unit connected to said second housing, said power unit and said second housing defining a second chamber, said power unit having a first end portion including a gear portion, said first end portion being positioned within said second chamber;
   a rotatable gear rotatably mounted within said first chamber;
   a pinion having a shaft portion, an external gear portion, and an internal gear portion, said pinion being rotatably mounted within said first chamber, said shaft portion having first and second end portions and defining a longitudinal bore extending therethrough, said external gear portion adapted to mesh with said rotatable gear;
   a first bearing assembly mounting said first end portion of said shaft portion within said first housing;
   a second bearing assembly mounting said second end portion of said shaft portion within said second housing;
   a planet gear carrier, a sprocket wheel, and a supporting hub adapted to be rotated by said power unit, said pinion, and said rotatable gear; and
   means for delivering lubricating fluid to said second bearing assembly from said first oil chamber.

10. A final drive arrangement, as set forth in claim 9, wherein said means for delivering lubricating fluid includes a steel ring secured between said first housing and said first end portion of said shaft portion.

11. A final drive arrangement, as set forth in claim 10, wherein said means for delivering lubricating fluid further includes a cavity defined by said first housing, said steel ring, and said first end portion of said shaft portion, and a passageway within said first housing, said passageway connecting said first chamber to said cavity.

12. A final drive arrangement, as set forth in claim 11, wherein said means for delivering lubricating fluid includes said second chamber and said longitudinal bore.

* * * * *